United States Patent
Freihart

(10) Patent No.: US 7,152,521 B2
(45) Date of Patent: Dec. 26, 2006

(54) METHOD AND DEVICE FOR COMPRESSING SQUARE BALES FOR STALK MATERIAL

(75) Inventor: Josef Freihart, Seubersdorf (DE)

(73) Assignee: Maschinenfabrik Bernard Krone GmbH, Spelle (DE)

(*) Notice: Subject to any disclaimer, the term of this patent is extended or adjusted under 35 U.S.C. 154(b) by 379 days.

(21) Appl. No.: 10/475,727

(22) PCT Filed: Feb. 27, 2002

(86) PCT No.: PCT/EP02/02106

§ 371 (c)(1),
(2), (4) Date: Jul. 1, 2004

(87) PCT Pub. No.: WO03/071858

PCT Pub. Date: Sep. 4, 2003

(65) Prior Publication Data

US 2006/0230950 A1    Oct. 19, 2006

(51) Int. Cl.
*B65B 13/02*    (2006.01)
*B65B 13/26*    (2006.01)
*A01D 59/04*    (2006.01)

(52) U.S. Cl. .............................. 100/2; 100/4; 100/19 R; 100/33 R; 56/343; 56/433; 289/1.5; 289/2

(58) Field of Classification Search .................. 100/2, 100/3, 4, 8, 17, 19 R, 20, 22, 24, 29, 31, 100/33 R; 56/341, 343, 433; 289/1.5, 2, 289/6

See application file for complete search history.

(56) References Cited

U.S. PATENT DOCUMENTS 4,074,623 A * 2/1978 White ........................... 100/3
6,708,478 B1 * 3/2004 Mesmer et al. ............... 56/343

FOREIGN PATENT DOCUMENTS

| DE | 19520751 | A1 | * | 12/1996 |
| EP | 429798 | A1 | * | 6/1991 |
| EP | 880886 | A2 | * | 12/1998 |

\* cited by examiner

*Primary Examiner*—Lowell A. Larson
*Assistant Examiner*—Jimmy Nguyen
(74) *Attorney, Agent, or Firm*—Gudrun E. Huckett

(57) ABSTRACT

In a method and a device for compressing square large bales for stalk material on large baling presses by using twines that engage across longitudinal sides and end faces of bales and are tied together, wherein compressed large bales can be formed by a number of adjacently positioned, individually compressed and tied small bales, a first tying unit and a second tying unit at a pressing channel of a large baling press are provided, wherein the first and second tying units have knotters. The first tying unit for tying individual small bales can be activated. Alternatively, the first and second tying units can be activated individually together for simultaneously tying several small bales to form a large bale, wherein the first and second tying units interact with the same knotters.

13 Claims, 3 Drawing Sheets

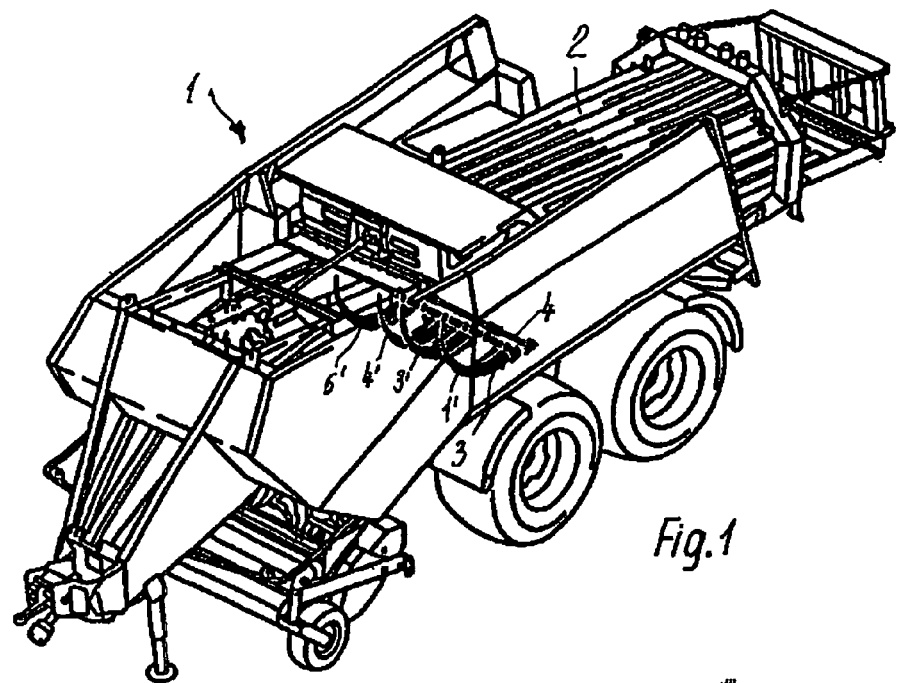
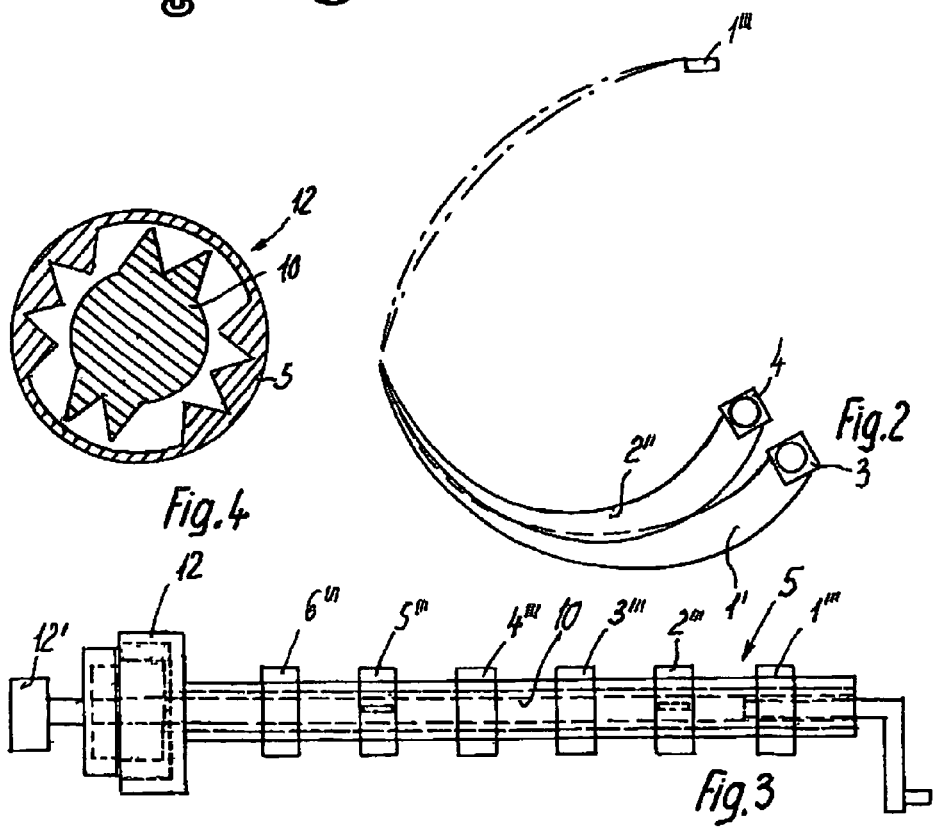

METHOD AND DEVICE FOR COMPRESSING SQUARE BALES FOR STALK MATERIAL

BACKGROUND OF THE INVENTION

The invention relates to a method and a device for compressing square bales for stalk material, in particular, for hay and straw, on large baling presses by means of twine strings that engage across longitudinal sides and end faces of the large bales and are tied together, wherein the compressed large bales can be formed by a number of adjacently positioned, individually compressed and tied small bales.

As is well known, the large bales that are produced on large baling presses have a great weight so that they are difficult to manipulate and require complex machines for transport and storage. On the other hand, gathering of large bales can be performed with minimal time expenditure. In order to improve handling of compressed hay and straw bales, small bales are known also that can be easily transported by hand or by small auxiliary devices, such as wheelbarrows or the like, but require great labor expenditure for field removal and storage.

SUMMARY OF THE INVENTION

The invention has the object to provide measures in connection with large baling presses that enable the production of compressed large square bales as well as small bales.

According to the invention, this object is solved in that the pressing channel of the large baling press has correlated therewith two tying units, wherein alternatively one binding unit is activated for tying individual small bales and both tying units are activated individually for simultaneously and together tying several small bales to form a large bale and wherein both tying units interact with the same knotters. By means of the method steps, depending on the activation of the tying unit, large bales or small bales can be produced and, in this way, an adaptation of the pressing and transporting process and storage as well as use can be provided in an advantageous way. In this connection, tying units with single or double knotting devices can be used. The user of the large baling press is thus given the possibility of producing compressed large bales or small bales as well as any partial bales of both bale types from the stalk material that is provided for pressing.

In a device for performing the method, it is provided that the tying unit that is embodied as a single knotting device has knotters that can be switched on and off and have permanently contacting tying twines and that the knotters provided for intermediate tying of small bales can be activated separately from one another and can be made to interact with a number of needles corresponding to the number of activated knotters that are pivotable into engagement while the remaining needles remain in a rest position.

Preferably, the knotters for intermediate and main tying of the bales are arranged on an outer shaft with inner toothing that receives an inner shaft with outer toothing meshing with the inner toothing, wherein the outer and the inner shaft can be coupled to one another and separated from one another by coupling members, for example, a star coupling, a friction coupling, a magnet coupling, a wheel coupling or the like, and wherein, by relative movement of the inner shaft and the outer shaft, the knotters for the intermediate tying action can be switched on and off, wherein, for controlling the inner shaft, a length measuring wheel contacting the compressed bale positions by means of an electromagnetic control device a pressure cylinder engaging the inner shaft.

In one embodiment of the device, it is provided that the needles for the intermediate tying operation and the other needles required for the main tying operation are arranged on a first support and a second support that are arranged adjacent and axis-parallel to one another and are pivotable, for example, on pipes, profiled rods or the like, wherein by means of the second support the needles for the intermediate tying can be advanced separately to the predetermined knotters and wherein the two supports, when locked relative to one another hydraulically or mechanically, simultaneously advance the needles for intermediate tying and main tying to the second and first knotters.

In a further embodiment of the invention, it is possible to arrange the needles for intermediate tying of small bales and the needles for the main tying operation together on a common shaft adjacent to one another and to configure the needles for intermediate tying relative to the others so as to be separately drivable so that they can be advanced to the activated knotters for forming the small bales.

Moreover, it is also provided that the tying unit operating with double knotting devices has first and second knotters without permanently contacting tying twines and that the knotters have correlated therewith a common support for needles provided with twines. The first knotters with correlated needles activated for cooperation by them for intermediate tying and the first and the second knotters for forming a large bale can be activated for cooperating simultaneously with the needles of the intermediate tying operation and the other needles. Accordingly, the double knotting devices operate without switching off the knotters because this tying technique does not provide for a constant suspension of twines in the knotters and, in this way, only those knotters will perform tying that have needles with twines supplied thereto.

Finally, it is also proposed to supply the needles for intermediate tying of the small bales by means of a rotary movement of the needles of the second support to the knotters and, in order to enable an uninhibited pivoting movement of the needles of the second support, to provide through openings, recesses, steps or the like in the first support or, by providing a corresponding correlation of the two supports, to guide the needles past one another.

Moreover, it is also conceivable to configure the needle supports so as to be pivotable and/or slidable together or separately individually for the purpose of cooperation with the knotters.

BRIEF DESCRIPTION OF THE DRAWINGS

The invention will be explained in the following with the aid of embodiments in the Figures. It is shown in:

FIG. 1 a large bale press for performing the method, in a perspective view;

FIG. 2 needles arranged on supports for small bales and the corresponding needles;

FIG. 3 a support shaft for knotters in a side view;

FIG. 4 a coupling for a support shaft according to FIG. 3, in section,

DESCRIPTION OF PREFERRED EMBODIMENTS

Figure 5:
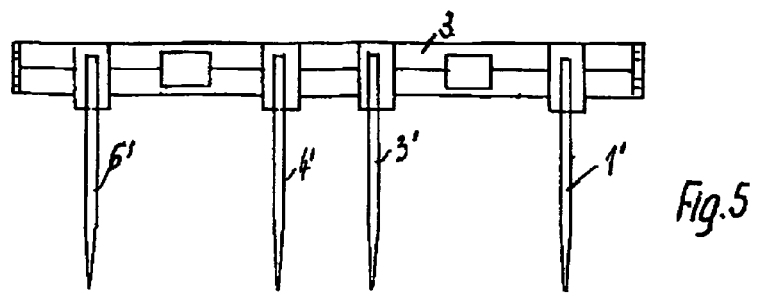
FIG. 5 a support pipe with needles in a plan view.

In the Figures numeral 1 refers to a square large baling press and numeral 2 refers to a pressing channel. Moreover, supports 3 and 4 are provided with first and second needles 1', 3', 4', 6' and 1", 5". On a support shaft 5 (FIG. 3) correlated with the needles six knotters 1'''–6''' are arranged also. The support shaft 5 engages with an inner toothing an outer toothing of the inner shaft 10. Both shafts 5 and 10 are connectable to one another by a coupling 12, as illustrated in FIG. 4.

Figure 8:
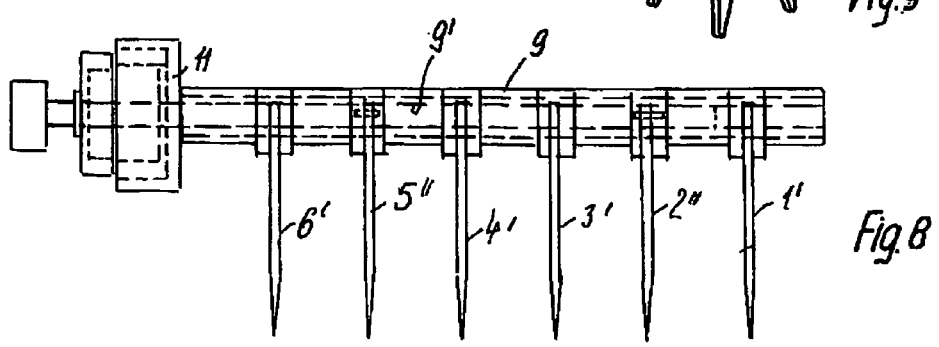
FIG. 8 another support pipe with needles in a plan view.
Figure 10:
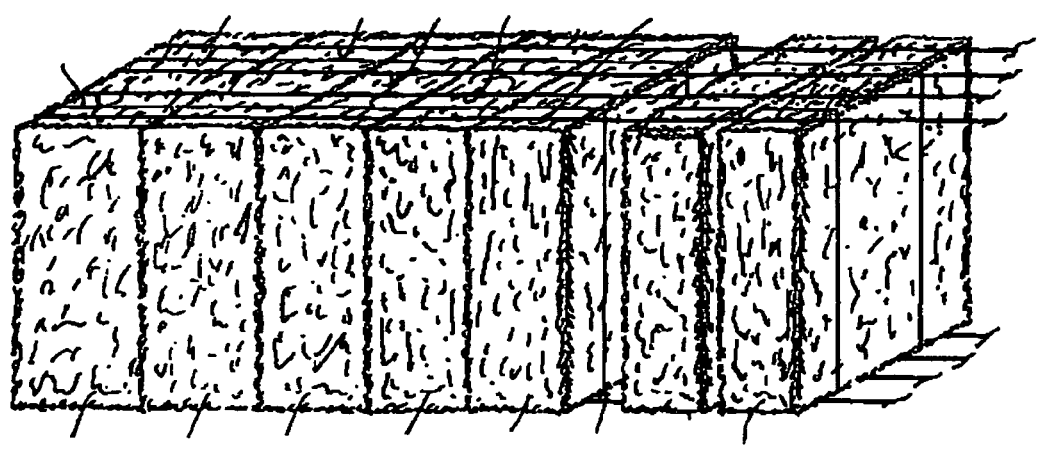
FIG. 10 a large bale with small bales, in a perspective view.

The needles 1', 3', 4', and 6' are fixedly connected to a support 3 having a prism cross-section. Finally, the support 9 (FIG. 8) for the needles 1', 2", 3', 4', 5", 6' can be activated; it receives a coupling shaft 9' with an inner toothing that activates by means of coupling 11 the needles 2" and 5" either for pressing small bales or the needles 1', 3', 4', 6', and 2", 5" all together for pressing large bales.

In the following an example for intermediate tying of small bales on a press with single knotting device is explained.

Example intermediate tying:

An example for intermediate tying is demonstrated with a press having a single knotting device of 1.20 m bale width and 70 cm height. The bales are tied particularly with six twines.

Since for a single knotting device there must always be a twine within each knotter and, in the case of six knotters 1'''–6''', the four tying knotters 1''', 3''', 4''', 6''' at rest must not be triggered for the intermediate binding action, these knotters must be mounted so as to be switchable on and off (FIG. 3).

In regard to switching on and off the knotters:

This problem can be solved in the following way. An hollow shaft 5 with inner toothing is used for positioning the knotters 1'''–6'''. An inner shaft 10 that is partially toothed on its exterior is guided in the hollow shaft 5a. By moving and partial rotation of the inner shaft 10 by means of a coupling 12, the desired knotters can be switched on and off. The control of the inner shaft 10 is enabled by means of a length measuring wheel 15 on the bale, wherein the wheel at the desired point in time correctly positions by means of an electromagnetic hydraulic control device 12' a cylinder mounted on the shaft 10 with inner toothing.

For clarifying this even more, a working example is described where one bale having a total length of 2 m is shown in, for example, 5 parts.

At the beginning of the pressing process, six threaded twines are positioned in the single knotters 1'''–6'''. Material is then pushed into the pressing channel 2 to the positioned twines. After approximately 40 cm bale guiding, the first intermediate tying action by means of the second 2''' and fifth 5''' knotters is triggered. The same process is to be repeated four times. In order to complete the bale, during the last action all six knotters must be triggered for forming a large bale.

For the intermediate tying action of the small bales, the needle swing is manufactured such that, as needed, all needles or only two can be moved to the knotters.

Figure 11:
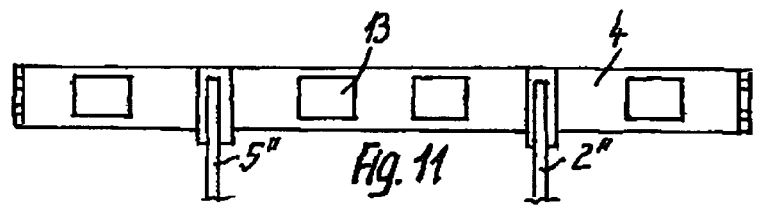
FIG. 11 a support pipe with needles in a plan view.

For the intermediate tying action of the exemplary bale, the needles 2" and 5" must be triggered. The needles 1', 3', 4', and 6', must remain in the rest position. The problem is to be solved, for example, such that the needles 2" and 5" are mounted on a support 4 (FIG. 11) and the support 4 is provided with recesses 13 for the needles 1', 3', 4', and 6'.

Figure 6:
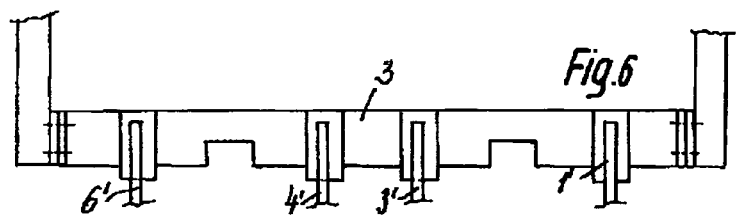
FIG. 6 a support pipe for a needle arrangement according to FIG. 5 in a different embodiment.
Figure 7:
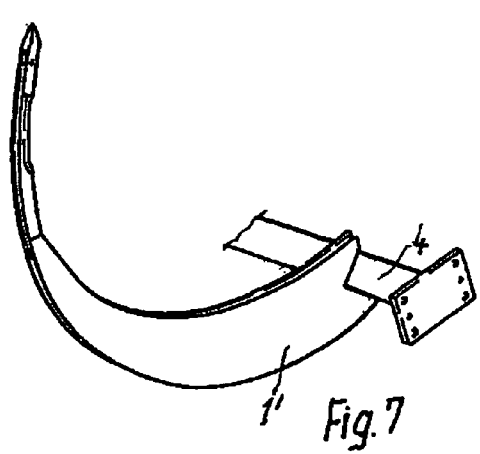
FIG. 7 a support pipe with a needle, in a perspective view.
Figure 9:
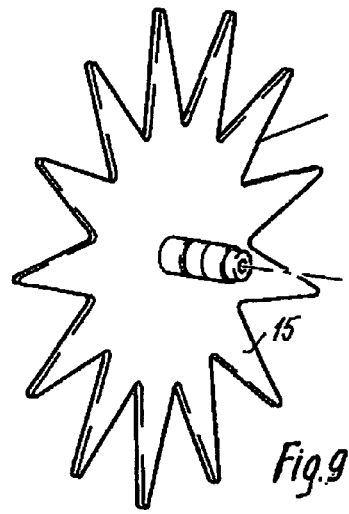
FIG. 9 a measuring wheel, in a perspective view.

Accordingly, for an intermediate tying process the carrier 4 with two needles can be lifted with the needle swing. When a tying process is to be triggered with all needles in order to complete tying of the bale, the needles 1', 3', 4', 6' that are mounted on a second support 3 (FIG. 5) with a swing must be locked in the rest position with one another hydraulically/mechanically, and all needles must be supplied in a single sweep to the six knotters wherein, depending on the assignment of the supports 3 and 4, the needles 1', 3', 4', 6' penetrate the cutouts 13 of the support 4 or are guided so as to pass one another. FIG. 6 shows another embodiment of the support 3.

In the case of machines with double knotting devices, a switch-off of the knotters is not required because in this technique no twines are suspended at all times in the knotters and, in this way, only those knotters can perform tying that are supplied with twine by the needles.

What is claimed is:

1. A method for compressing square large bales for stalk material on large baling presses by using twines that engage across longitudinal sides and end faces of bales and are tied together, wherein compressed large bales can be formed by a number of adjacently positioned, individually compressed and tied small bales; the method comprising the steps of:
   providing a first tying unit and a second tying unit at a pressing channel of a large baling press, wherein the first and second tying units, each having knotters and needles;
   alternatively activating only the first tying unit for tying individual small bales and activating the first and second tying units individually together for simultaneously tying several small bales to form a large bale, wherein the first and second tying units interact with the same knotters.

2. The method according to claim 1, wherein the first and second tying units are single knotting devices or double knotting devices.

3. A device for performing the method according to claim 1, the device comprising:
   a first tying unit and a second tying unit, wherein the tying units are configured as single knotting devices having first and second knotters that are switchable on and off and are provided with twines that permanently contact bales to be formed;
   wherein the first and second tying units have first and second needles;
   wherein the first knotters serve for intermediate tying of small bales and are separately and independently activatable and interact with the first needles pivotable into engagement with the first knotters;
   wherein the second needles remain in a rest position while the first needles carry out intermediate tying of the small bales.

4. A device according to claim 3, further comprising:
   an outer shaft having an inner toothing and an inner shaft having an outer toothing, wherein the inner shaft is arranged inside the outer shaft and the outer toothing meshes with the inner toothing;
   a length measuring wheel contacting the bales to be formed;
   an electromagnetic control device connected to the length measuring wheel;
   a pressure cylinder engaging the inner shaft and acted on by the electromagnetic control device;
   wherein the first and the second knotters together serve for intermediate tying and main tying of the bales and are arranged on the outer shaft;

a coupling member arranged between the inner shaft and the outer shaft and configured to couple the inner and outer shafts to one another or to separate the inner and outer shafts from one another;

wherein a relative movement between the inner shaft and the outer shaft switches the first knotters on and off for intermediate tying;

wherein, for controlling the inner shaft, the length measuring wheel positions the pressure cylinder via the electromagnetic control device.

5. The device according to claim 4, wherein the coupling is a star coupling, a friction coupling, a magnet coupling, or a wheel coupling.

6. The device according to claim 3, wherein the tying units are double knotting devices, wherein the first and second knotters are separately activatable and are without twines permanently contacting the bales to be formed, wherein the first and second needles provided with twines have a common support correlated with the first and second knotters, wherein the first knotters and the first needles are used for tying small bales and wherein the first and the second knotters interact simultaneously together with the first needles for intermediate tying and the second needles for forming large bales.

7. The device according to claim 3, further comprising a first support and a second support, wherein the first needles for intermediate tying are arranged on the first support and the second needles for a main tying action are arranged on the second support, wherein the first and second supports are arranged adjacent and axis-parallel to one another and are pivotable, wherein the second support advances the second needles separately to the second knotters and the first and second supports, when locked hydraulically or mechanically with one another, supply the first and second needles simultaneously to the first and second knotters for the intermediate and main tying actions.

8. The device according to claim 7, wherein the first and second supports are pipes or profiled rods.

9. The device according to claim 7, wherein the first needles or the second needles are moved by a rotary movement of the first and second supports, respectively, to the first and second knotters and wherein the first support or the second support has through openings, recesses or steps for the second needles or the first needles, respectively, for an unimpeded movement of the second or first needles.

10. The device according to claim 3, further comprising a shaft, wherein the first and second needles are arranged together on the shaft adjacent to one another, wherein the first needles are drivable separately and independently relative to the second needles for intermediate tying of the small bales or driven simultaneously and together with the second needles for tying the large bales.

11. The device according to claim 3, comprising first and second needle supports for the first and second needles, respectively, wherein the first and second needle supports are pivotable by swings for interaction with the first and second knotters together or separately individually.

12. The device according to claim 3, comprising first and second needle supports for the first and second needles, respectively, wherein the first and second needle supports are pivotable and moveable by swings for interaction with the first and second knotters together or separately individually.

13. The device according to claim 3, comprising first and second needle supports for the first and second needles, respectively, wherein the first and second needle supports are moveable by swings for interaction with the first and second knotters together or separately individually.

* * * * *